United States Patent
Johansen et al.

(10) Patent No.: US 11,239,681 B2
(45) Date of Patent: Feb. 1, 2022

(54) METHOD FOR INDUCTIVE CHARGING OF A RECHARGEABLE HEARING INSTRUMENT

(71) Applicant: GN HEARING A/S, Ballerup (DK)

(72) Inventors: Jan Johansen, Koge (DK); Søren Christian Ell, Roskilde (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 16/805,613

(22) Filed: Feb. 28, 2020

(65) Prior Publication Data

US 2020/0203981 A1 Jun. 25, 2020

Related U.S. Application Data

(63) Continuation of application No. PCT/EP2018/074602, filed on Sep. 12, 2018.

(30) Foreign Application Priority Data

Sep. 15, 2017 (EP) .................................... 17191283

(51) Int. Cl.
*H04R 25/00* (2006.01)
*H02J 7/02* (2016.01)
(Continued)

(52) U.S. Cl.
CPC .............. *H02J 7/02* (2013.01); *H02J 7/0047* (2013.01); *H02J 50/10* (2016.02); *H04R 25/30* (2013.01);
(Continued)

(58) Field of Classification Search
CPC ..... H04R 25/55; H04R 2225/31; H02J 50/12; H02J 50/80; H02J 50/90
See application file for complete search history.

(56) References Cited

U.S. PATENT DOCUMENTS

| 4,379,988 A | * | 4/1983 | Mattatall | H04R 25/00 320/108 |
| 5,303,305 A | * | 4/1994 | Raimo | H02J 7/35 381/323 |

(Continued)

FOREIGN PATENT DOCUMENTS

| CN | 103051024 | 4/2013 |
| CN | 103703652 | 4/2014 |

(Continued)

OTHER PUBLICATIONS

European Search Report dated Feb. 20, 2018 for corresponding EP Application No. 17191283.5.

(Continued)

*Primary Examiner* — Ryan Robinson
(74) *Attorney, Agent, or Firm* — Vista IP Law Group, LLP

(57) ABSTRACT

A charging kit for inductively charging a rechargeable hearing instrument having an inductive coil, includes: a base unit having a first cavity; and an adapter configured to be received by the first cavity, wherein the adapter comprises a second cavity configured to receive the rechargeable hearing instrument; wherein the base unit is configured to determine a characteristic of the inductive coil of the hearing instrument; wherein the base unit is configured to provide a current by the base unit based at least in part on the determined characteristic of the inductive coil; and wherein the base unit is configured to inductively charge the rechargeable hearing instrument.

42 Claims, 2 Drawing Sheets

(51) Int. Cl.
*H02J 50/10* (2016.01)
*H02J 7/00* (2006.01)

(52) U.S. Cl.
CPC ......... *H04R 25/554* (2013.01); *H04R 25/602* (2013.01); *H04R 2225/31* (2013.01)

(56) References Cited

U.S. PATENT DOCUMENTS

| | | | |
|---|---|---|---|
| 7,823,598 B2* | 11/2010 | Stern | B08B 3/10 |
| | | | 134/116 |
| 8,126,177 B2* | 2/2012 | Jensen | H04R 25/00 |
| | | | 381/323 |
| 8,265,315 B2* | 9/2012 | Sorensen | H04R 25/554 |
| | | | 381/323 |
| 8,344,689 B2* | 1/2013 | Boguslavskij | H04R 25/554 |
| | | | 320/108 |
| 8,996,777 B2* | 3/2015 | Slattery | G06F 13/4081 |
| | | | 710/303 |
| 9,014,405 B2* | 4/2015 | Larsen | H02J 50/12 |
| | | | 381/315 |
| 9,094,059 B2* | 7/2015 | Lee | H02J 7/02 |
| 9,161,141 B2* | 10/2015 | Martius | H02J 50/80 |
| 9,729,003 B1* | 8/2017 | Chow | H02J 7/0047 |
| 9,821,672 B2* | 11/2017 | Chae | H02J 7/025 |
| 9,843,870 B2* | 12/2017 | Naumann | H04R 25/30 |
| 9,899,872 B2* | 2/2018 | Sugawara | H02J 50/80 |
| 10,218,223 B2* | 2/2019 | Hatanaka | H02J 7/04 |
| 10,424,977 B2* | 9/2019 | Ikefuji | H02J 7/00 |
| 10,932,065 B2* | 2/2021 | Ayache | F26B 9/003 |
| 2013/0249306 A1 | 9/2013 | Kim et al. | |
| 2014/0044281 A1 | 2/2014 | Ganem et al. | |
| 2016/0072327 A1* | 3/2016 | Knutson | G06F 1/1632 |
| | | | 320/108 |
| 2016/0127843 A1 | 5/2016 | Ku et al. | |
| 2016/0269836 A1 | 9/2016 | Martius et al. | |
| 2017/0194809 A1 | 7/2017 | Partovi et al. | |
| 2019/0089187 A1* | 3/2019 | Konomi | H02J 50/12 |
| 2019/0208342 A1* | 7/2019 | Higgins | H04R 1/02 |
| 2019/0306637 A1* | 10/2019 | Aazami | H04R 25/65 |
| 2020/0185968 A1* | 6/2020 | Kim | H02J 50/10 |
| 2020/0227932 A1* | 7/2020 | Kim | H02J 7/00034 |

FOREIGN PATENT DOCUMENTS

| | | | |
|---|---|---|---|
| CN | 104009511 | 8/2014 | |
| CN | 104638736 | 5/2015 | |
| CN | 104704858 | 6/2015 | |
| CN | 105933839 | 9/2016 | |
| DE | 29718104 U1 * | 1/1998 | ............ H02J 50/90 |
| DE | 10 2015 203 536 A1 | 9/2016 | |
| DE | 102015203536 A1 * | 9/2016 | ........... H02J 7/0042 |
| EP | 3001696 | 3/2016 | |
| WO | WO 2019/053060 A1 | 3/2019 | |

OTHER PUBLICATIONS

International Search Report and Written Opinion dated Sep. 12, 2018 for corresponding PCT Application No. PCT/EP2018/074602.
Foreign OA for CN Patent Appln. No. 201880059176.0 dated Mar. 3, 2021.
English Translation of CN OA dated Mar. 3, 2021 for CN Appn. No. 201880059176.0.
Keskin, N., "Fast Charging Method for Wireless and Mobile Devices using Double-Pulse Charge Technique", School of Electrical Engineering and Computer Science, Copyright 2014.
Wang, F., "Wireless power supply is actually not far from US," Power Science, dated May 2015.
Foreign Communication for EP Patent Appln. No. 18765649.1 dated Oct. 10, 2021.

* cited by examiner

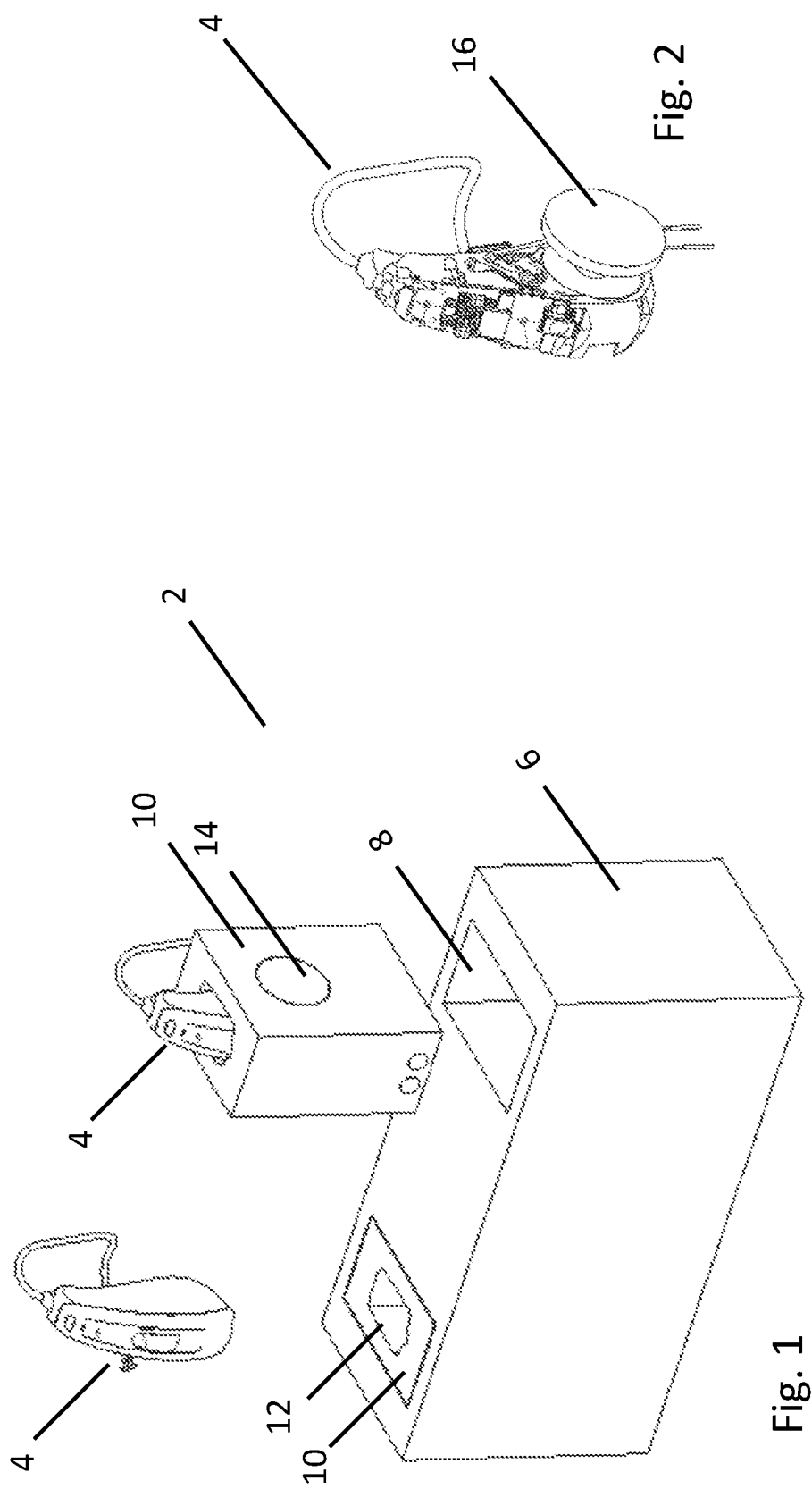

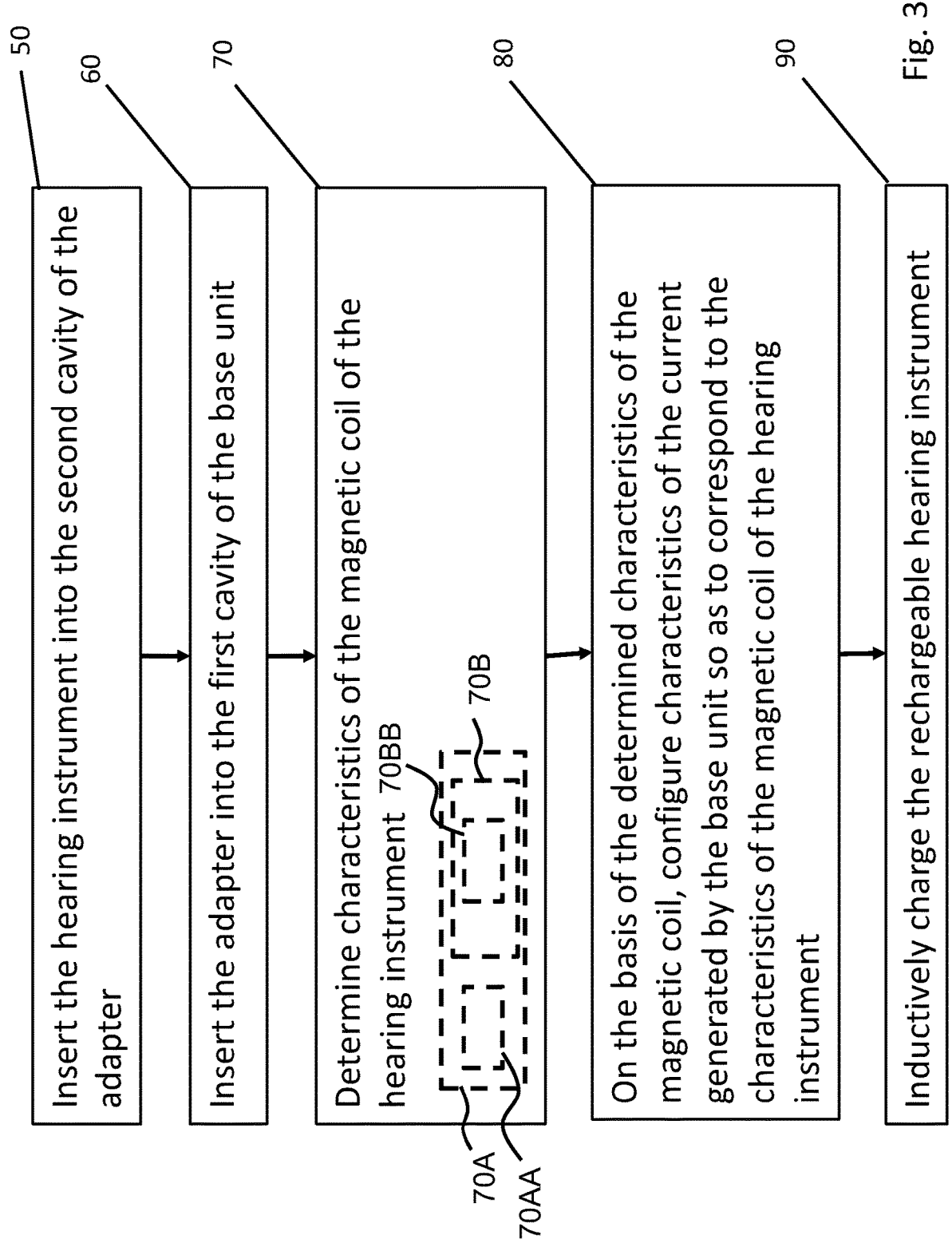

METHOD FOR INDUCTIVE CHARGING OF A RECHARGEABLE HEARING INSTRUMENT

RELATED APPLICATION DATA

This application is a continuation of International Patent Application No. PCT/EP2018/074602 filed on Sep. 12, 2018, which claims priority to European Patent Application No. 17191283.5 filed on Sep. 15, 2017. The entire disclosures of the above applications are expressly incorporated by reference herein.

FIELD

The present disclosure relates to a method for inductive charging of a rechargeable hearing instrument.

BACKGROUND

Hearing instruments (HI) require energy to function properly. Traditionally, the energy is provided by a battery, either disposable or rechargeable, the latter normally offering superior user experience. These rechargeable batteries are normally replenished using conventional, galvanic charging technology. Recently, however, wireless, and in particular inductive, charging has seen increased popularity, also in the field of hearing instruments.

Typically, charging of a rechargeable hearing instrument is enabled by means of a portable charging unit. As is widely known in the art, different types of hearing instruments, e.g. Behind-the-ear (BTE), Completely-in-the-canal (CIC), Receiver-in-ear (RIE), are purposefully designed and built in a different manner, with components being placed at the most suitable place for each particular type of device. In the same context, charging units are designed in parallel with the corresponding hearing instrument and with a tailored set of functionalities in order to maximally conform to the technical specification of the corresponding hearing instrument.

DE102015203536 discloses an adapter with an inductive coil for enabling inductive charging of a hearing aid. DE102015203536 primarily targets charging of the hearing aid while the aid is in use, i.e. arranged at the ear. As a consequence, the adapter is in preferred embodiments hook-shaped so that it, when attached to the hearing aid itself, may stay in place at the ear. A base part is used for galvanically supplying power to the adapter. To this purpose, the adapter, when in engagement with the hearing aid, is positioned in indentations provided in the base part.

In conformity with other documents belonging to the prior art, DE102015203536 fails to provide a universal inductive charging solution. In particular, DE102015203536 doesn't disclose a charging solution able to efficiently deal with different coil parameters, e.g. number of windings in the coil, thickness of the coil thread, size and general shape of the coil. Here, coil parameters and hence coil performance are typically selected so as to comply with the requirements of the specific HI-model.

US 2016/269836 relates to a wireless charging system for hearing instruments freely positionable in a charging device.

SUMMARY

It is an object of the present disclosure to at least alleviate above-identified and other drawbacks associated with the current art.

The above stated objective is achieved by means of the method according to the independent claim, and by the embodiments according to the dependent claims.

More specifically, the present disclosure provides a method for inductively charging a rechargeable hearing instrument having an inductive coil by means of a charging kit. The charging kit comprises a current-generating base unit comprising a first cavity and an adapter adapted or configured to be received in said first cavity, wherein the energy is transferable from the base unit to the adapter when the adapter is received in the first cavity. The adapter and/or the base unit is further provided with an inductive coil, and the adapter comprises a second cavity adapted to receive the rechargeable, inductively-charged hearing instrument. The method comprises the acts or steps of inserting the hearing instrument into the second cavity of the adapter, inserting the adapter into the first cavity of the base unit, determining characteristics of the inductive coil of the hearing instrument, on the basis of the determined characteristics of the inductive coil, configuring characteristics of the current generated by the base unit so as to correspond to the characteristics of the inductive coil of the hearing instrument, and inductively charging the rechargeable hearing instrument.

It is to be noted that the method steps do not have to take place in a specific order, such as the order indicated above, for the method to be properly executed. In particular, the adapter may be inserted into the first cavity of the base unit prior to inserting the hearing instrument into the second cavity belonging to the adapter. In the following, positive effects and advantages are presented.

On a general level, a charging solution consisting of two separate parts (base unit and adapter) is desirable as it contributes in avoiding strong constraints when designing the hearing instruments/chargers. More specifically and as is known in the art, a substantial number of components is required to render inductive charging of the hearing instrument possible, both with regards to energy conversion, but also with respect to added functionality such as charger-device communication during charging, e.g. to inform on battery level in the hearing instrument. Advantageously, a majority of these components is placed in the base unit that inherently is of considerable size. In the same context, as few components as possible should be placed in the relatively small adapter.

With respect to the inductive coil and as discussed above, inductive coils of different hearing instruments have different characteristics. Accordingly, by receiving relevant information regarding characteristics of the inductive coil integrated in the hearing instrument, the base unit may configure the characteristics of the current it generates so that it corresponds to the characteristic of the inductive coil integrated in the hearing instrument.

Here, one pertinent characteristic of the inductive coil integrated in the hearing instrument is its operational frequency, i.e. the frequency of the AC current resulting in optimal inductive energy transfer.

In this way, a single base unit may be used for charging across the entire product portfolio of hearing instruments, as all base units (holding the majority of the required components) are identical, both in terms of appearance as well as the components integrated therein, whereas the adapters are HI-specific and typically differ in shape and positioning of the inductive coil.

Further advantages and features of embodiments will become apparent when reading the following detailed description in conjunction with the drawings.

BRIEF DESCRIPTION OF THE DRAWINGS

FIG. 1 is a perspective view of a charging kit for an inductively-charged hearing instrument and a rechargeable hearing instrument itself.

FIG. 2 is a perspective view of a coil of an inductively-charged hearing instrument of the BTE-type.

FIG. 3 shows a flow chart of the method for inductively charging a rechargeable hearing instrument according to one embodiment of the present disclosure.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method for inductively charging a rechargeable hearing instrument having an inductive coil (first inductive coil) by means of a charging kit, said charging kit comprising a current-generating base unit comprising a first cavity, an adapter adapted to be received in said first cavity, wherein energy is transferable from the base unit to the adapter when the adapter is received in the first cavity, the adapter further being provided with an inductive coil (second inductive coil), and wherein the adapter comprises a second cavity adapted to receive the rechargeable, inductively-charged hearing instrument. The method comprises the steps of inserting the hearing instrument into the second cavity of the adapter, inserting the adapter into the first cavity of the base unit, determining characteristics of the (first) inductive coil of the hearing instrument, on the basis of the determined characteristics of the (first) inductive coil, configuring characteristics of the current generated by the base unit so as to correspond to the characteristics of the (first) inductive coil of the hearing instrument, and inductively charging the rechargeable hearing instrument, optionally according to the characteristics of the current generated by the base unit.

A method for inductively charging a rechargeable hearing instrument is disclosed. The hearing instrument may be a hearable or a hearing aid, wherein the processor is configured to compensate for a hearing loss of a user. The hearing aid or hearable may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing instrument may be a hearing protection device or a headset.

It is to be understood that the second inductive coil may be arranged in the base unit for wirelessly transferring energy to the hearing instrument. Thereby, a simple adapter with no electrical circuits and/or contacts is provided for.

In the method, configuring characteristics of the current generated by the base unit so as to correspond to the characteristics of the inductive coil of the hearing instrument is based on the determined characteristics of the inductive coil.

Accordingly, a method for inductively charging a rechargeable hearing instrument having a first inductive coil by means of a charging kit is disclosed, the charging kit comprising a current-generating base unit and an adapter, the base unit comprising a first cavity and a second inductive coil, wherein the adapter is configured to be received in said first cavity, the adapter comprising a second cavity configured to receive the rechargeable hearing instrument and wherein energy is transferable from the base unit to the hearing instrument when the adapter is received in the first cavity and the hearing instruments is received in the second cavity. The method comprises inserting the hearing instrument into the second cavity of the adapter; inserting the adapter into the first cavity of the base unit; determining characteristics of the first inductive coil of the hearing instrument; configuring, based on the determined characteristics of the first inductive coil, characteristics of the current generated by the base unit so as to correspond to the characteristics of the first inductive coil of the hearing instrument; and inductively charging the rechargeable hearing instrument, optionally according to the characteristics of the current generated by the base unit.

The inductive coil of the hearing instrument may also be denoted first inductive coil.

The inductive coil of the adapter/base unit may also be denoted second inductive coil.

The step of determining characteristics of the (first) inductive coil of the hearing instrument may comprise determining operational frequency of the (first) inductive coil of the hearing instrument. The operational frequency of the (first) inductive coil may be in the range between 1 and 100 kHz.

In the method, determining characteristics of the (first) inductive coil of the hearing instrument may comprise providing information to the base unit about characteristics of the (first) inductive coil of the hearing instrument. Thus, determining characteristics of the (first) inductive coil of the hearing instrument may comprise obtaining characteristics of the (first) inductive coil of the hearing instrument from the hearing instrument and/or from a memory of the base unit. Characteristics of the first inductive coil may comprise one or more of a device ID of the hearing instrument, coil ID of the first inductive coil, and operational frequency of the first inductive coil.

Determining operational frequency of the (first) inductive coil may comprise the hearing instrument providing information to the base unit about the operational frequency of the (first) inductive coil of the hearing instrument. Thus, determining operational frequency of the (first) inductive coil may comprise obtaining/receiving information about the operational frequency of the (first) inductive coil of the hearing instrument from the hearing instrument.

The hearing instrument providing information to the base unit about the operational frequency of the (first) inductive coil may comprise establishing a wireless connection between the hearing instrument and the base unit, whereby device ID of the hearing instrument is optionally transferred to the base unit. Thus, one or more exemplary methods comprise, e.g. as part of providing/obtaining information to the base unit about the operational frequency of the first inductive coil, obtaining information about the operational frequency of the first inductive coil of the hearing instrument from the hearing instrument. Obtaining information about the operational frequency of the first inductive coil may comprise establishing a wireless connection between the hearing instrument and the base unit and receiving device ID of the hearing instrument from the hearing instrument, e.g.

by the hearing instrument transmitting one or more of a device ID of the hearing instrument, coil ID of the first inductive coil, and operational frequency of the first inductive coil.

The device ID of the hearing instrument may be used to select an operational frequency value from a set of operation frequency values stored in a memory of the base unit, whereupon AC current at the selected operational frequency is supplied to the inductive coil of the adapter.

Determining operational frequency of the (first) inductive coil may further comprise supplying AC current to the (second) inductive coil of the adapter according to a charging scheme comprising supplying AC current at at least two different frequencies.

The charging scheme may be discontinued if the inductive energy supply to the hearing instrument results in that the energy level of the battery of the rechargeable hearing instrument increases by a value that exceeds a predetermined energy amount. The predetermined energy amount may be in the range from 2 mAh to 20 mAh, e.g. 10 mAh.

The method may comprise the step of resetting the base unit and/or the adapter. The hearing instrument and the base unit and/or the adapter may be connected via a 2.4 GHz wireless link. The hearing instrument and the base unit may be connected via a 2.4 GHz wireless link. The hearing instrument and the adapter may be connected via a 2.4 GHz wireless link. The base unit and the adapter may be connected via a 2.4 GHz wireless link.

FIG. 1 is a perspective view of a charging kit for an inductively-charged hearing instrument and a rechargeable hearing instrument itself. The shown kit comprises a base unit 6 and two adapters 10. The two inductively-charged hearing instruments 4 are also shown, both are hearing aids of the BTE-type. One BTE-device is inserted into the adapter and the other is positioned above the inserted adapter. Here, it is to be understood that many different ear-worn devices such as traditional hearing aids, tinnitus maskers, non-prescription hearing aids and others, all are encompassed by the employed omnibus term hearing instrument.

As it may be seen in FIG. 1, the base unit 6 optionally has two oppositely positioned cavities 8, arranged at the respective end of the base unit housing. Obviously, a base unit holding a single cavity 8 is equally conceivable. Each shown cavity may receive a corresponding adapter.

Given its considerable size and system constraints as discussed above, it is desirable to fit as many system components as possible in the base unit. Thus, base unit 6 typically holds some/all of the following components: a charging circuit, a current converter, a radio receiver, a USB-socket and a battery and a display for displaying charging time and/or remaining charging time and/or charging level. By virtue of the present disclosure, a single base unit may be used for charging across the entire product portfolio of hearing instruments, as all base units are identical, both in terms of appearance as well as the components integrated therein. It is an important advantage of the present disclosure that a charging system (base unit and/or adapter) with few charging coils (second inductive coil) is provided for.

The adapter 10, on the other hand, is to be as simple as possible while conforming to the requirements imposed by the hearing instrument 4. The adapter 10 optionally has a coil 14 (second inductive coil) suitable for inductively transferring energy to the coil 16 of the hearing instrument 4 (shown in FIG. 2). Here, the process of inductive charging of the hearing instrument is based on electro-inductive phenomena well known to the person skilled in the art. In one or more exemplary methods and/or system, the second inductive coil forms a part of the base unit. The adapter 10 typically has metallic contacts. The base unit 6 has similar contacts for electrically connecting the base unit and the adapter. The metallic contacts of the adapter and the base unit are in mutual contact when the adapter 10 is received in the cavity 8 of the base unit 6. In consequence, electrical energy may galvanically be transferred from the base unit 6 to the adapter 10. In one or more embodiments, these metallic contacts are magnetized for easier establishment of the galvanic connection between the adapter and the base unit.

FIG. 2 is a perspective view of a coil 16 of an inductively-charged hearing instrument 4 of the BTE-type. When the hearing instrument is inserted in the cavity 12 of the adapter, the two coils 14, 16 face one another. Further, for modern BTE-devices of standard size, the optimal distance between the two inductive coils 14, 16 is less than 3.0 mm, more preferred less than 2.5 mm and most preferred less than 2.0 mm. It is desirable to keep the distance as short as possible. This results in the best possible energy transfer. Normally, the centers of the first and the second disc-shaped inductive coils are aligned in a direction substantially perpendicular to the coil planes, when the hearing instrument 4 is received in the cavity 8 of the base unit 6.

FIG. 3 shows a flow chart of the method for inductively charging a rechargeable hearing instrument according to one embodiment. Hardware used for inductive charging has been described in connection with FIG. 1. In the following, method steps are discussed in greater detail.

Firstly, the hearing instrument is inserted 50 into the second cavity of the adapter. Subsequently, the adapter is inserted 60 into the first cavity of the base unit. It is to be understood that the adapter may be inserted into the first cavity prior to or simultaneously with inserting the hearing instrument into the second cavity. Further, characteristics of the inductive coil of the hearing instrument are determined 70. After that and on the basis of the determined characteristics of the first inductive coil, characteristics of the current generated by the base unit are configured 80 so as to correspond to the characteristics of the first inductive coil of the hearing instrument. Finally, the rechargeable hearing instrument is inductively charged 90.

By receiving relevant information regarding characteristics of the (first) inductive coil integrated in the hearing instrument, the base unit may configure 80 the characteristics of the current it generates, i.e. the current generated by the base unit for charging the hearing instrument, so that it corresponds to the characteristic of the inductive coil integrated in the hearing instrument. In this way, a single base unit may be used for charging across the entire product portfolio of hearing instruments, as all base units (holding the majority of the required components) are identical, whereas the adapters are HI-specific and typically differ in shape and positioning of the inductive coil.

In one or more embodiments, the step of determining 70 characteristics of the inductive coil of the hearing instrument comprises determining 70A operational frequency of the inductive coil, i.e. the frequency of the AC current that results in optimal inductive energy transfer from the adapter coil to the HI-coil.

Determining 70A operational frequency of the inductive coil entails that the hearing instrument provides information 70B to the base unit about its operational frequency, i.e. the operational frequency of the first inductive coil. In one variant, normally when the battery of the inserted hearing instrument is partially charged, this results in establishment 70BB of a wireless connection between the inserted hearing instrument and the base unit, whereby device ID of the hearing instrument is transferred to the base unit. The transferring of the device ID takes place using techniques well known to the artisan. In this context, the hearing instrument and the base unit are connected via a 2.4 GHz wireless link, such as Bluetooth. The device ID of the hearing instrument is used at the base unit to select an operational frequency value from a set of operation frequency values stored in a memory of the base unit. Subsequently, AC current at the selected operational frequency is supplied to the inductive coil of the adapter. Inductive energy transfer between the adapter coil and the HI-coil then takes place with maximum efficiency as the operational frequency of the AC current flowing in the adapter coil is tailored to suit the coil integrated in the hearing instrument.

In one or more exemplary embodiments, typically when the battery of the hearing instrument is fully discharged, determining operational frequency of the inductive coil comprises supplying 70AA AC current to the inductive coil of the adapter according to a charging scheme comprising supplying AC current at at least two different frequencies. As a consequence, the battery is charged by energy pulses carried by AC current at different frequencies. For each pulse, the battery might become more charged. This efficiency of this process depends on degree of matching between the operational frequency of the coil integrated in the hearing instrument and the frequency of the instant AC current flowing through the adapter coil. The charging scheme is discontinued if the inductive energy supply to the hearing instrument for a given instant AC current results in that the energy level of the battery of the rechargeable hearing instrument increases by a value that exceeds a predetermined energy amount. Such an increase suggests that the instant AC current is a perfect match for the coil integrated in the hearing instrument. Subsequently, the hearing instrument provides information to the base unit about its operational frequency, as described above. In one or more embodiments, the predetermined energy amount is in the range from 2 mAh to 20 mAh, e.g. 10 mAh.

In certain situations, it may be beneficial to reset the base unit, e.g. if an error has occurred. For instance, after that a wrong hearing instrument had been placed in the adapter. Thus, the method may comprise resetting the base unit and/or the adapter, e.g. in accordance with an error criterion being satisfied and/or in accordance with determining that charging is completed. Charging may be completed if it is detected that the adapter and/or the hearing instrument is removed from the base unit. Accordingly, the method may comprise determining if an error has occurred, e.g. by determining if an error criterion is satisfied.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents. In the drawings and specification, typical preferred embodiments of the invention are disclosed and, although specific terms are employed, they are used in a generic and descriptive sense only and not for purposes of limitation, the scope of the invention being set forth in the following claims.

LIST OF REFERENCES 2 charging kit
4 hearing instrument
6 current-generating base unit
8 first cavity
10 adapter
12 second cavity
14 inductive coil of adapter
16 inductive coil of hearing instrument
50 inserting the hearing instrument into the second cavity of the adapter
60 inserting the adapter into the first cavity of the base unit
70 determining characteristics of the inductive coil of the hearing instrument
70A determining operational frequency of the inductive coil of the hearing instrument
70AA supplying AC current to the inductive coil of the adapter according to a charging scheme
70B providing information to the base unit about its operational frequency
70BB establishing a wireless connection between the hearing instrument and the base unit
80 configuring characteristics of the current generated by the base unit
90 inductively charging the rechargeable hearing instrument

The invention claimed is:

1. A charging kit for inductively charging a hearing instrument having an inductive coil, comprising:
   a base unit having a first cavity;
   an adapter in the first cavity, wherein the adapter comprises a second cavity configured to receive the hearing instrument; and
   a charging coil, wherein the second cavity of the adapter is located away from a center of the charging coil;
   wherein the base unit is configured to determine a characteristic of the inductive coil of the hearing instrument;
   wherein the base unit is configured to provide a current by the base unit based at least in part on the determined characteristic of the inductive coil; and
   wherein the base unit is configured to inductively charge the hearing instrument.

2. The charging kit of claim 1, wherein the base unit is configured to determine the characteristic of the inductive coil of the hearing instrument by determining an operational frequency of the inductive coil of the hearing instrument.

3. The charging kit of claim 2, wherein the operational frequency of the inductive coil of the hearing instrument is anywhere between 1 and 100 kHz.

4. The charging kit of claim 2, wherein the base unit is configured to determine the operational frequency of the inductive coil by receiving information associated with the operational frequency of the inductive coil, the information transmitted by the hearing instrument.

5. The charging kit of claim 4, wherein the information associated with the operational frequency of the inductive coil comprises a device ID of the hearing instrument.

6. The charging kit of claim 1, wherein the base unit is configured to establish a wireless connection with the hearing instrument.

7. The charging kit of claim 1, wherein the base unit is configured to receive a device ID of the hearing instrument by the base unit.

8. The charging kit of claim 7, wherein the base unit is configured to:
select an operational frequency value from a set of operation frequency values stored in a memory of the base unit based on the device ID of the hearing instrument; and
supply AC current at the selected operational frequency value to the charging coil.

9. The charging kit of claim 1, wherein the base unit is configured to supply AC current at at least two different frequencies to the charging coil while the hearing instrument is in the second cavity of the adapter.

10. The charging kit of claim 1, wherein the base unit is configured to discontinue a charging scheme if an inductive energy supply for the hearing instrument results in an energy level of a battery of the hearing instrument increasing by a value that exceeds a predetermined energy amount.

11. The charging kit of claim 10, wherein the predetermined energy amount is 10 mAh.

12. The charging kit of claim 1, wherein the charging kit is configured to reset the base unit and/or the adapter.

13. The charging kit of claim 1, wherein the base unit and/or the adapter is configured to connect with the hearing instrument and via a 2.4 GHz wireless link.

14. The charging kit of claim 1, wherein the current provided by the base unit has a characteristic that corresponds with the determined characteristic of the inductive coil of the hearing instrument.

15. The charging kit of claim 1, wherein the adapter is configured to receive energy from the base unit.

16. A method for inductively charging a hearing instrument having an inductive coil, the method being performed by a charging kit comprising a base unit having a first cavity, and an adapter in the first cavity, and wherein the adapter comprises a second cavity configured to receive the hearing instrument, the method comprising:
receiving the hearing instrument by the second cavity of the adapter;
receiving the adapter by the first cavity of the base unit;
determining a characteristic of the inductive coil of the hearing instrument;
providing a current by the base unit based at least in part on the determined characteristic of the inductive coil; and
inductively charging the hearing instrument;
wherein the hearing instrument is charged using a charging coil of the charging kit, wherein the second cavity of the adapter is located away from a center of the charging coil.

17. The method of claim 16, wherein the act of determining the characteristic of the inductive coil of the hearing instrument comprises determining an operational frequency of the inductive coil of the hearing instrument.

18. The method of claim 17, wherein the operational frequency of the inductive coil of the hearing instrument is anywhere between 1 and 100 kHz.

19. The method of claim 17, wherein the act of determining the operational frequency of the inductive coil comprises receiving, by the base unit, information associated with the operational frequency of the inductive coil, the information being transmitted by the hearing instrument.

20. The method of claim 19, wherein the information associated with the operational frequency of the inductive coil comprises a device ID of the hearing instrument.

21. The method of claim 16, further comprising establishing a wireless connection between the hearing instrument and the base unit.

22. The method of claim 16, further comprising receiving a device ID of the hearing instrument by the base unit.

23. The method of claim 22, further comprising:
selecting an operational frequency value from a set of operation frequency values stored in a memory of the base unit based on the device ID of the hearing instrument; and
supplying AC current at the selected operational frequency value to the charging coil.

24. The method of claim 17, wherein the act of determining the operational frequency of the inductive coil comprises supplying AC current at at least two different frequencies to the charging coil while the hearing instrument is in the second cavity of the adapter.

25. The method of claim 16, further comprising discontinuing a charging scheme if an inductive energy supply for the hearing instrument results in an energy level of a battery of the hearing instrument increasing by a value that exceeds a predetermined energy amount.

26. The method of claim 25, wherein the predetermined energy amount is 10 mAh.

27. The method of claim 16, further comprising resetting the base unit and/or the adapter.

28. The method of claim 16, wherein the base unit and/or the adapter is connected with the hearing instrument and via a 2.4 GHz wireless link.

29. The method of claim 16, wherein the current provided by the base unit has a characteristic that corresponds with the determined characteristic of the inductive coil of the hearing instrument.

30. The method of claim 16, wherein the adapter is configured to receive energy from the base unit.

31. The charging kit of claim 1, wherein the adapter is a customized adapter.

32. The charging kit of claim 1, wherein the charging coil is secured to the adapter.

33. The charging kit of claim 1, wherein the charging coil is a part of the adapter.

34. The charging kit of claim 1, wherein the adapter has one or more electrical contacts.

35. The charging kit of claim 1, wherein the adapter has no electrical circuit and no electrical contact.

36. A charging kit for inductively charging a hearing instrument having an inductive coil, comprising:
a base unit having a first cavity;
an adapter in the first cavity of the base unit, wherein the adapter comprises a second cavity configured to receive the hearing instrument; and
a charging coil;
wherein the base unit is configured to determine a characteristic associated with a charging of the hearing instrument;

wherein the base unit is configured to provide a current by the base unit based at least in part on the determined characteristic;

wherein the base unit is configured to inductively charge the hearing instrument; and wherein the base unit is configured to supply AC current at at least two different frequencies to the charging coil while the hearing instrument is in the adapter.

37. The charging kit of claim 36, wherein the characteristic associated with a charging of the hearing instrument comprises a characteristic of the inductive coil.

38. The charging kit of claim 36, wherein the adapter is a customized adapter.

39. The charging kit of claim 36, wherein the charging coil is secured to the adapter.

40. The charging kit of claim 36, wherein the charging coil is a part of the adapter.

41. The charging kit of claim 36, wherein the adapter has one or more electrical contacts.

42. The charging kit of claim 36, wherein the adapter has no electrical circuit and no electrical contact.

* * * * *